US009721387B2

(12) United States Patent
Chou

(10) Patent No.: US 9,721,387 B2
(45) Date of Patent: Aug. 1, 2017

(54) SYSTEMS AND METHODS FOR IMPLEMENTING AUGMENTED REALITY

(75) Inventor: Chen-Wei Chou, Hualien (TW)

(73) Assignee: CYBERLINK CORP., Shindian, Taipei (TW)

(*) Notice: Subject to any disclaimer, the term of this patent is extended or adjusted under 35 U.S.C. 154(b) by 884 days.

(21) Appl. No.: 13/330,976

(22) Filed: Dec. 20, 2011

(65) Prior Publication Data
US 2012/0154638 A1 Jun. 21, 2012

Related U.S. Application Data

(60) Provisional application No. 61/425,393, filed on Dec. 21, 2010.

(51) Int. Cl.
H04N 5/262 (2006.01)
H04N 9/74 (2006.01)
G06T 19/00 (2011.01)
H04N 5/222 (2006.01)
H04N 5/272 (2006.01)
(Continued)

(52) U.S. Cl.
CPC .......... *G06T 19/006* (2013.01); *G06K 9/3216* (2013.01); *G06T 7/73* (2017.01); *H04N 5/2224* (2013.01); *H04N 5/272* (2013.01); G06T 2207/10016 (2013.01); G06T 2207/20081 (2013.01); G06T 2207/30204 (2013.01)

(58) Field of Classification Search
CPC ......... G06T 19/006; G06T 2207/30204; G06T 7/73; G06T 2207/10016; G06T 2207/20081; H04N 5/272; H04N 5/2224; G06K 9/3216

USPC .......................................... 382/103; 345/622
See application file for complete search history.

(56) References Cited

U.S. PATENT DOCUMENTS 4,703,318 A * 10/1987 Haggerty ...................... 345/634
7,295,220 B2 11/2007 Zhou et al.
(Continued)

OTHER PUBLICATIONS

Kato, Marker Tracking and HMD Calibration for a Video-based Augmented Reality Conferencing System, Augmented Reality, 1999. (IWAR '99) Proceedings. 2nd IEEE and ACM International Workshop on Date Oct. 20-21, 1999.*
(Continued)

Primary Examiner — Tapas Mazumder
(74) Attorney, Agent, or Firm — McClure, Qualey & Rodack, LLP

(57) ABSTRACT

A method implemented in a video playback system is described for incorporating augmented reality (AR) into a video stream. The method comprises determining a target pattern, determining an inner pattern in the target pattern, determining a relationship between the target pattern and the inner pattern, and receiving, by the video playback system, frames of the video stream. For each frame within the frame sequence, binarization is performed according to a predetermined threshold. Based on whether a location of the target pattern can be determined, a location of the inner pattern is determined. Based on the location of the inner pattern on received frames and the determined relationship between the target pattern and the inner pattern, a location of the target pattern is determined. The method further comprises displaying a virtual object with the target pattern on an output device based on the location of the target pattern.

26 Claims, 14 Drawing Sheets

(51) Int. Cl.
    *G06K 9/32*    (2006.01)
    *G06T 7/73*    (2017.01)

(56) References Cited

U.S. PATENT DOCUMENTS

| | | |
|---|---|---|
| 7,343,278 B2 | 3/2008 | Billinghurst et al. |
| 7,519,218 B2 | 4/2009 | Takemoto et al. |
| 7,769,236 B2 | 8/2010 | Fiala |
| 8,050,793 B1* | 11/2011 | Haskins et al. ............... 700/174 |
| 8,520,892 B2* | 8/2013 | Kuleschow et al. .......... 382/103 |
| 2007/0157217 A1* | 7/2007 | Jacobs .............. H04M 1/72525 |
| | | 719/330 |
| 2008/0101693 A1* | 5/2008 | Young .................. G06K 9/3208 |
| | | 382/165 |
| 2010/0014780 A1* | 1/2010 | Kalayeh ........................ 382/284 |
| 2010/0048242 A1 | 2/2010 | Rhoads et al. |
| 2010/0271403 A1* | 10/2010 | Tighe ............................ 345/661 |

OTHER PUBLICATIONS

Rekimoto, Matrix: A Realtime Object Identification and Registration Method for Augmented Reality, Computer Human Interaction, 1998. Proceedings. 3rd Asia Pacific , Date of Conference: Jul. 15-17, 1998 pp. 63-68.*

* cited by examiner

SYSTEMS AND METHODS FOR IMPLEMENTING AUGMENTED REALITY

CROSS-REFERENCE TO RELATED APPLICATION

This application claims priority to, and the benefit of, U.S. Provisional Patent Application entitled, "SYSTEMS AND METHODS FOR IMPLEMENTING AUGMENTED REALITY," having Ser. No. 61/425,393, filed on Dec. 21, 2010, which is incorporated by reference in its entirety.

TECHNICAL FIELD

The present disclosure generally relates to systems and methods for implementing augmented reality effects into a video stream.

BACKGROUND

Over the years, video capture devices such as webcams have become a popular means of communications, and live video communication over the Internet has become common among users around the world. Such programs as Windows Live Messenger® and Skype® allow users to engage in live, face-to-face conversations. The integration of special effects into video streams generated from webcams is a common feature for webcam programs. Programs are available that allow users to enhance webcam sessions by incorporating such special effects as graphics and augmented reality effects.

Augmented reality refers to technology that enhances a view of a physical world environment with virtual computer-generated effects, such as sound or graphics. Specifically, augmented reality adds graphics, sounds, feedback, among other effects to the real world as it exists. In typical implementations, a fiducial marker is used in the field of view of a video system. The fiducial marker serves as a reference point in the field of view on which graphics are superimposed. However, one perceived shortcoming with current systems that utilize fiducial markers is that partial occlusion may occur, for example, due to a user in the field of view obstructing a portion of the fiducial marker, thereby affecting the placement of graphics onto the fiducial marker.

SUMMARY

Briefly described, one embodiment, among others, is a method implemented in a video playback system is described for incorporating augmented reality (AR) into a video stream. The method comprises determining a target pattern, determining an inner pattern in the target pattern, determining a relationship between the target pattern and the inner pattern, and receiving, by the video playback system, frames of the video stream. For each frame within the frame sequence, binarization is performed according to a predetermined threshold. Based on whether a location of the target pattern can be determined, a location of the inner pattern is determined. Based on the location of the inner pattern on received frames and the determined relationship between the target pattern and the inner pattern, a location of the target pattern is determined. The method further comprises displaying a virtual object with the target pattern on an output device based on the location of the target pattern.

In accordance with another embodiment, a video system for incorporating augmented reality (AR) into a video stream comprises a marker module configured to determine a target pattern within the video stream, the marker module further configured to determine an inner pattern of the target pattern, wherein the marker module is further configured to determine a relationship between the target pattern and the inner pattern according to a spacing and relative location of each of the corners of the inner pattern with respect to corners of the outer boundary of the target pattern. the video system further comprises a tracker module configured to perform a tiered search of the target pattern within the video stream, a location estimator configured to determine a location of the target pattern according to a search result of the tracker module and the relationship between the target pattern and the inner pattern determined by the marker module, and an effects module configured to integrate a virtual object into the video stream according to the location of the target pattern.

In accordance with another embodiment, a method implemented in a video playback system for incorporating augmented reality (AR) into a video stream comprises determining a target pattern, determining an inner pattern in the target pattern, determining a relationship between the target pattern and the inner pattern, receiving, by the video playback system, a frame sequence of the video stream, performing a tiered search on a location of the target pattern, and displaying a virtual object based on the location of the target pattern.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
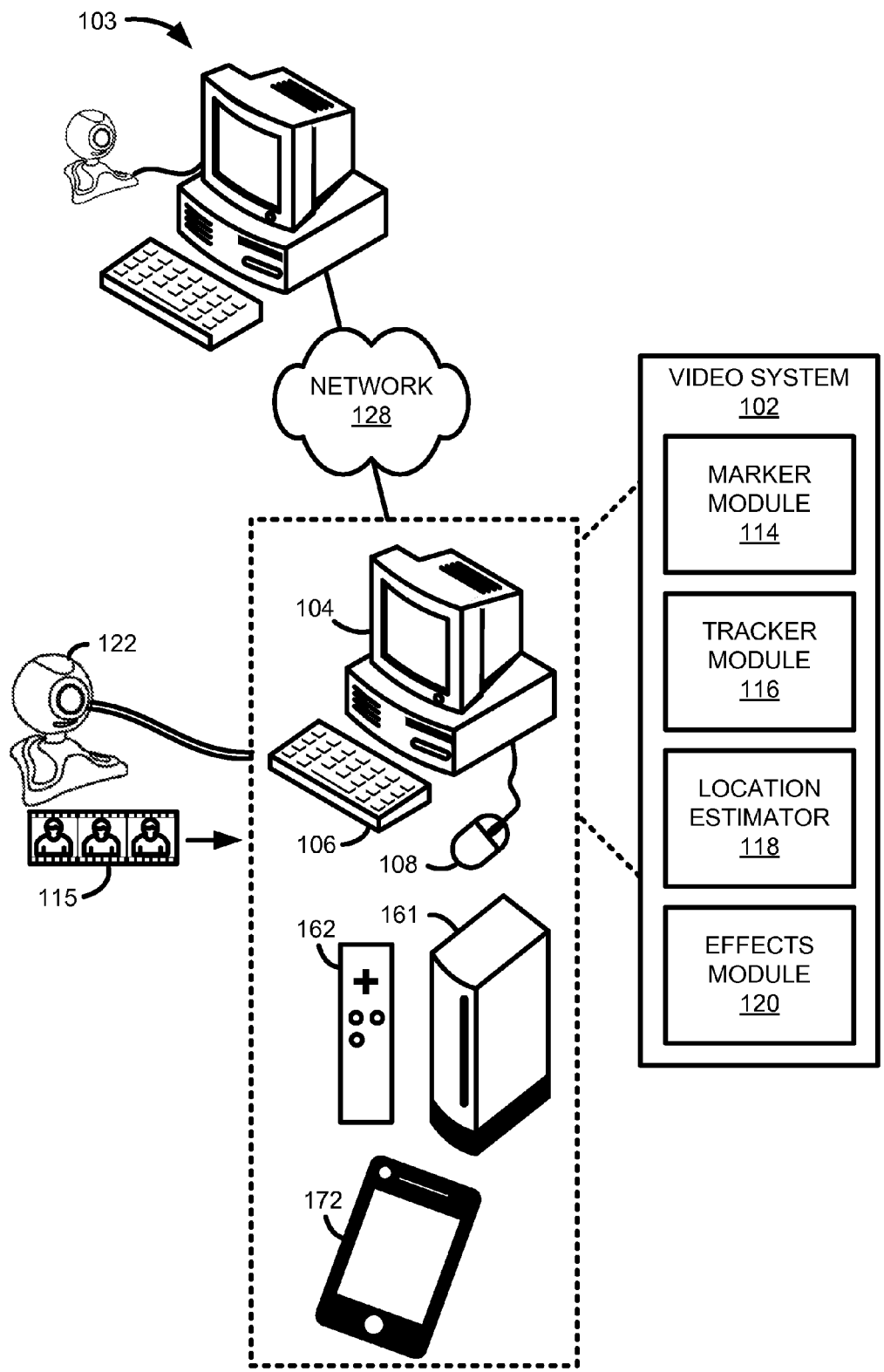
FIG. 1 is a block diagram of a video system configured to incorporate augmented reality into a received video stream.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Conventional approaches to incorporating augmented reality typically focus on first identifying a fiducial marker or target pattern within frames of a video stream. Based on the location of the target pattern within the field of view, one or more virtual objects are then placed on or around the target pattern, with the one or more virtual objects tracking the motion of the target pattern. Such motion may include, for example, panning, tilting, and rotations. One perceived shortcoming with conventional systems is that such systems rely on the target pattern being displayed in its entirety in front of the capture device in order to accurately track the motion of the target pattern.

Figure 3:
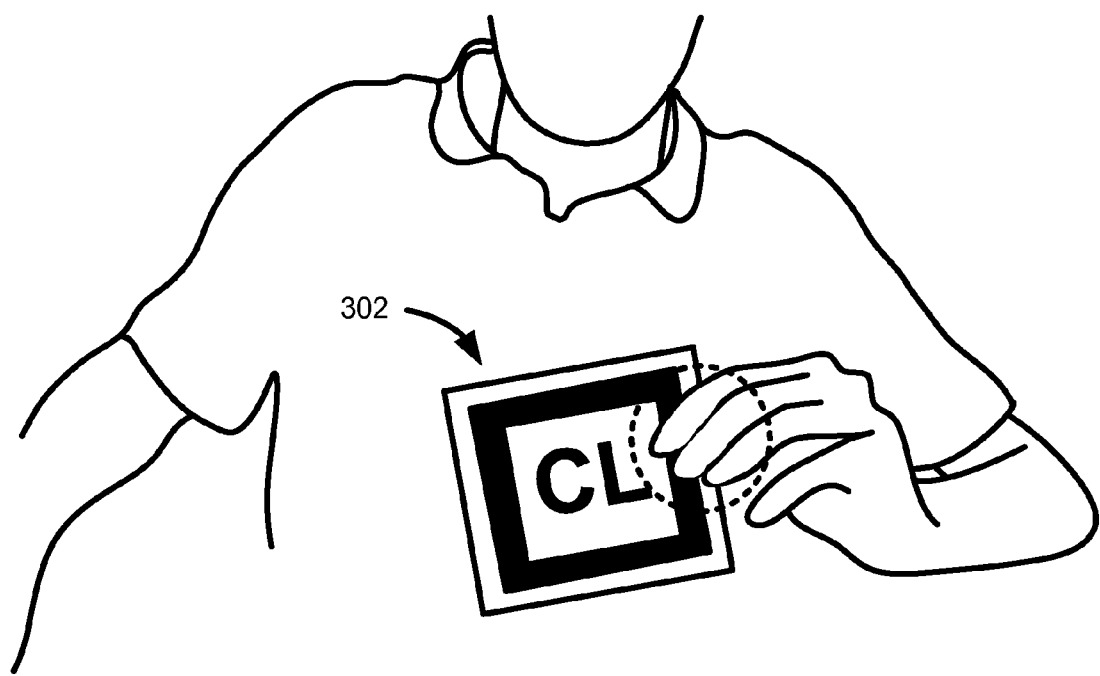
FIG. 3 illustrates partial occlusion due to a user holding a target pattern.

With reference to FIG. 3, in some cases, the target pattern may be obstructed or occluded by objects within the field of view. For example, the target pattern may be partially covered by the user's fingers while the user is holding the target pattern. In the illustration shown in FIG. 3, the user's fingers cover the outer boundary of the target pattern 302. For this non-limiting example, the target pattern 302 comprises a black box with the letters "CL" located inside the box. The undesired result of partial occlusion is that many conventional systems cannot track the target pattern. Depending on the degree of occlusion, the virtual objects may become misplaced within the field of view, thereby affecting the viewing experience. In this regard, conventional systems for incorporating augmented reality are generally susceptible to partial occlusion of the base pattern.

Various embodiments are described for providing a robust means of incorporating augmented reality into a video stream. In accordance with one embodiment, a method is implemented in a video playback system. As described in more detail later, the video playback system may include a webcam for capturing video streams. The method comprises determining a target pattern, where the target pattern includes an inner pattern. The method further comprises receiving, by the video playback system, a frame sequence of the video stream. For each frame within the frame sequence, binarization is performed according to a predetermined threshold. Then, depending on whether the location of the target pattern as a whole can be determined, a search of the inner pattern is performed.

Based on the location of the inner pattern, the location of the target pattern as a whole can be estimated based on characteristics of the target pattern, including, but not limited to the size of the target pattern with respect to the field of view and the size and orientation of the inner pattern with respect to the target pattern as a whole. Based on the location of the target pattern, virtual objects are then displayed on or around target pattern on an output device.

A description of a system for implementing augmented reality into a video stream is now described followed by a discussion of the operation of the components within the system. FIG. 1 is a block diagram of an environment in which embodiments of a video system 102 may be implemented. The video system 102 that may be embodied, for example, as a desktop computer, computer workstation, laptop, or other computing platform. In other embodiments, the video system 102 may be embodied as, but is not limited to, a video gaming console 161, which includes a video game controller 162 for receiving user preferences. For such embodiments, the video gaming console 161 may be connected to a television (not shown) or other display. The video system 102 may also be embodied as a smartphone 172.

The video system 102 includes a display 104 and input devices such as a keyboard 106 and a mouse 108. For some embodiments, the video system 102 is configured to interface with a webcam 122 coupled to the video system 102 and receive a video stream 115 from the webcam 122. The video system 102 comprises a marker module 114 configured to determine a target pattern within the video stream 115. The marker module 114 is also configured to determine an inner pattern of the target pattern. In other embodiments, the marker module 114 may be used to define a target pattern. The video system 102 further comprises a tracker module 116 configured to perform a tiered search of the target pattern within the video stream 115.

A location estimator 118 within the video system 102 is configured to determine a location of the target pattern according to a search result of the tracker module 116. The video system 102 also comprises an effects module 120 configured to integrate a virtual object into the video stream according to the location and orientation of the target pattern. As described in more detail later, when implemented in software, the components 114, 116, 118, 120 in the video system 102 are embodied as one or more programs stored on a non-transitory computer readable medium and executed by a processor on a computing system. The video system 102 in FIG. 1 may be coupled to a network 128, such as the Internet or a local area network (LAN). Through the network 128, the video system 102 may receive a video stream 115 from another video system 103. Utilizing the components 114, 116, 118, 120 described above, the video system 102 provides a robust means for implementing augmented reality into a received video stream 115.

Figure 2:
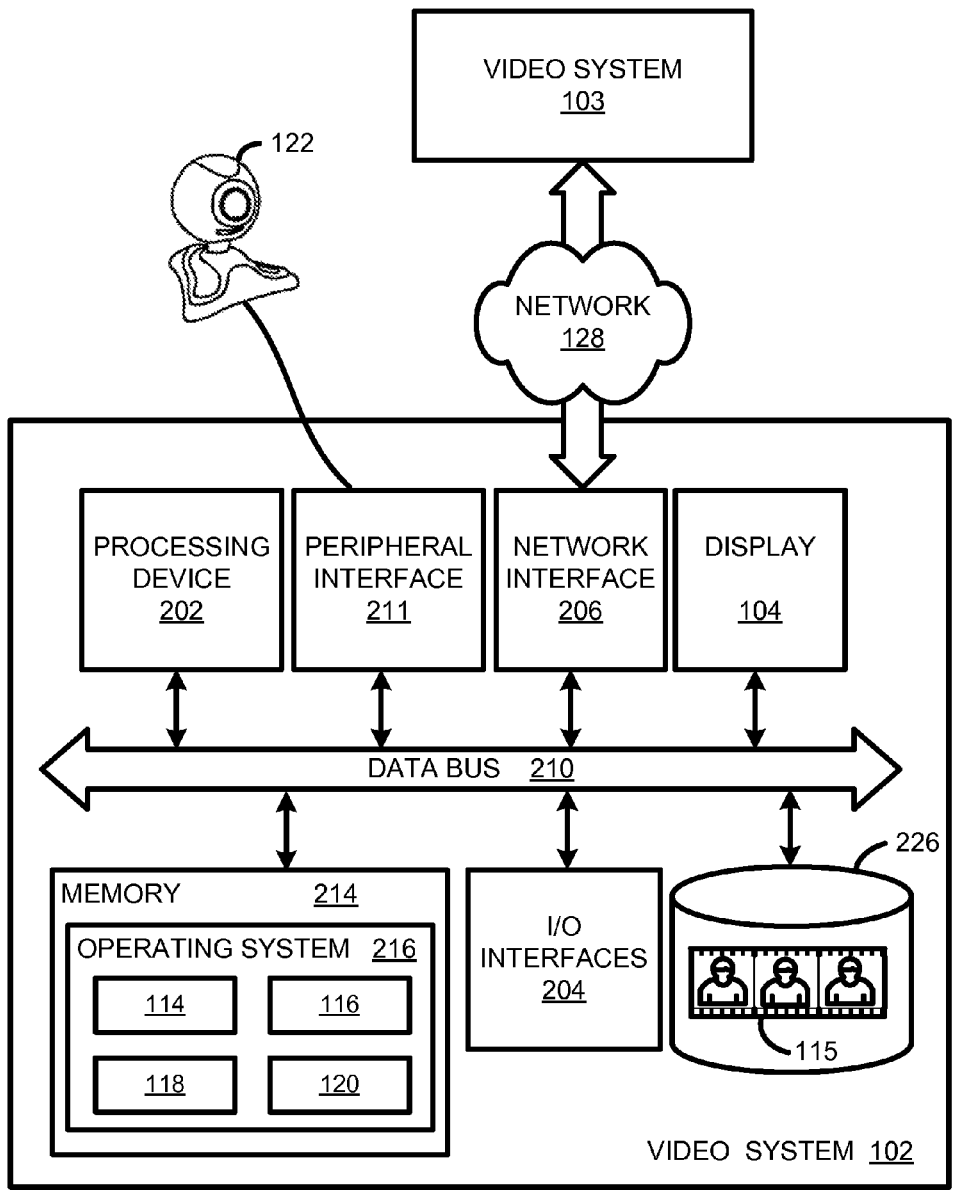
FIG. 2 illustrates an embodiment of the video system shown in FIG. 1.

FIG. 2 illustrates an embodiment of the video system 102 shown in FIG. 1. The video system 102 may be embodied in any one of a wide variety of wired and/or wireless computing devices, such as a desktop computer, portable computer, dedicated server computer, multiprocessor computing device, smartphone, personal digital assistant (PDA), digital camera, and so forth. As shown in FIG. 2, the video system 102 comprises a memory 214, a processing device 202, a number of input/output interfaces 204, a network interface 206, a display 104, a peripheral interface 211, and mass storage 226, wherein each of these devices are connected across a local data bus 210.

The processing device 202 may include any custom made or commercially available processor, a central processing unit (CPU) or an auxiliary processor among several processors associated with the video system 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216 (which may include but is not limited to, Microsoft® operating systems, Linux® operating system, Unix® operating systems, Apple® operating systems, and Google Android®), one or more native applications, emulation systems, or emulated applications for any of a variety of operating systems and/or emulated hardware platforms, emulated operating systems, etc. For example, the applications may include application specific software which may comprise some or all the components 114, 116, 118, 120 of the video system 102 depicted in FIG. 1. In accordance with such embodiments, the components 114, 116, 118, 120 are stored in memory 214 and executed by the processing device 202. One of ordinary skill in the art will appreciate that the memory 214 can, and typically will, comprise other components which have been omitted for purposes of brevity.

Input/output interfaces 204 provide any number of interfaces for the input and output of data. For example, where the video system 102 comprises a personal computer, these components may interface with one or more user input devices through the input/output interfaces 204 of the video system 102, where the input devices may comprise a keyboard 106 and/or a mouse 108, as shown in FIG. 1. The display 104 may comprise a computer monitor, a plasma screen for a PC, a liquid crystal display (LCD) on a hand held device, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

With further reference to FIG. 2, the network interface 206 comprises various components used to transmit and/or receive data over a network environment. For example, the network interface 206 may include a device that can communicate with both inputs and outputs, for instance, a modulator/demodulator (e.g., a modem), wireless (e.g., radio frequency (RF)) transceiver, a telephonic interface, a bridge, a router, network card, etc.). As shown in FIG. 2, the video system 102 may communicate with one or more video systems 103 via the network interface 206 over the network 128. The video system 102 may further comprise mass storage 226 which stores such data as a video stream 115. The peripheral interface 211 supports various interfaces including, but not limited to IEEE-1394 High Performance Serial Bus (Firewire), USB, a serial connection, and a parallel connection.

Figure 4:
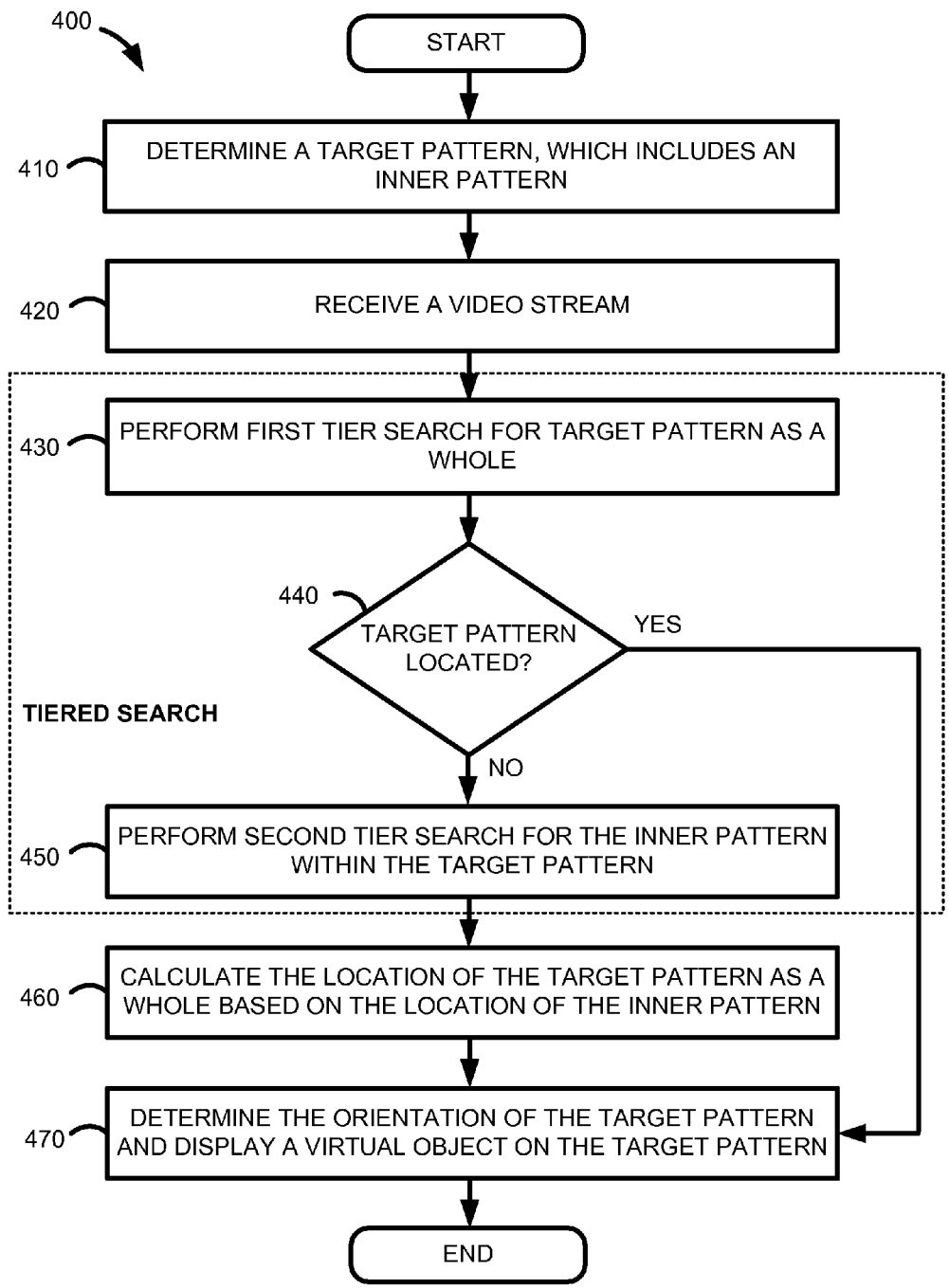
FIG. 4 is a flowchart for incorporating augmented reality into a video stream received at the video system of FIG. 1.

Reference is made to FIG. 4, which is a flowchart 400 illustrating a process implemented in the video system 102 of FIG. 1 for incorporating augmented reality into a video stream 115. If embodied in software, each block depicted in FIG. 4 represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system such as a processor in a computer system or other system such as the one shown in FIG. 1. The machine code may be converted from the source code, etc. If embodied in hardware, each block may represent a circuit or a number of interconnected circuits to implement the specified logical function(s).

Figure 5:
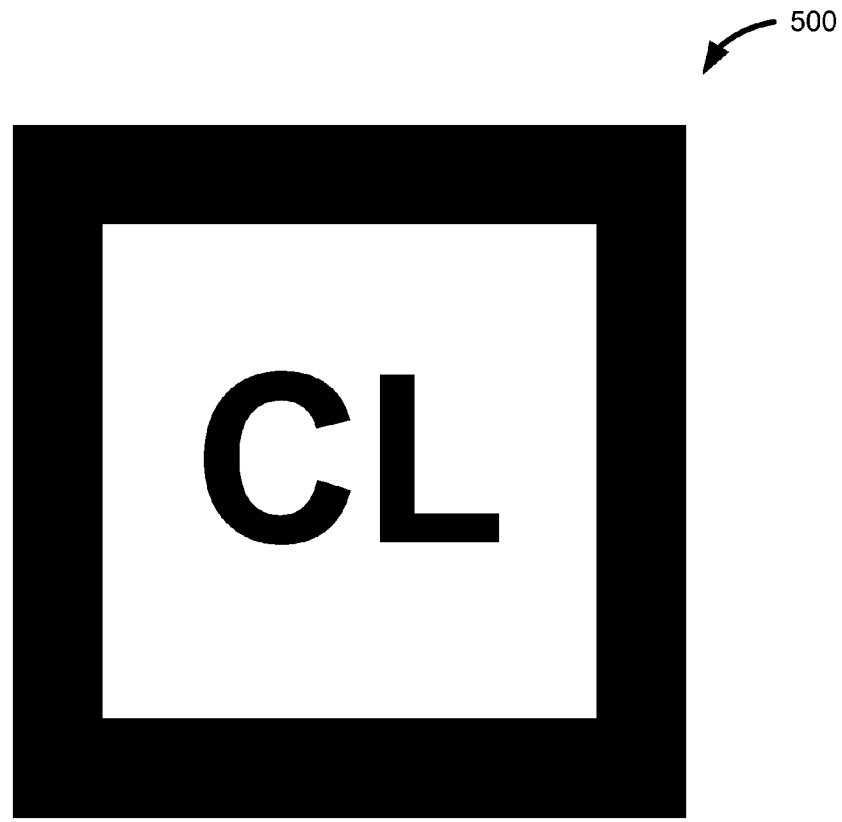
FIGS. 5-6 illustrate the use of an inner pattern of a target pattern for tracking purposes.
Figure 5:
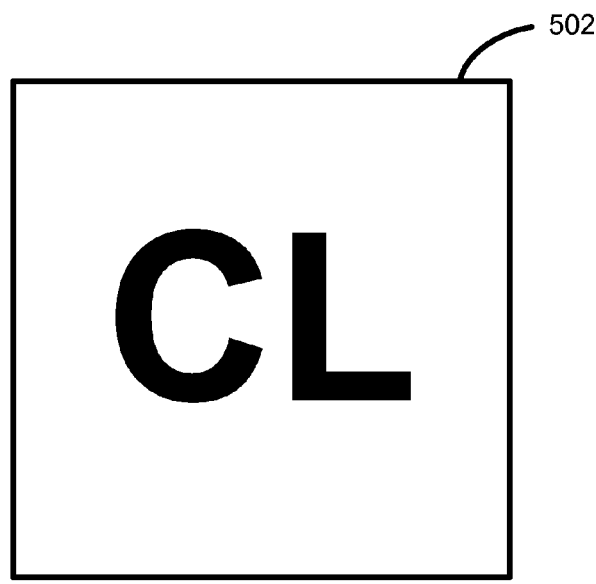

Although the flowchart 400 of FIG. 4 shows a specific order of execution, it is understood that the order of execution may differ from that which is depicted. Beginning with block 410, a target pattern is determined, which includes an inner pattern. Referring briefly to FIG. 5, a non-limiting example of a target pattern 500 is shown. The target pattern 500 includes an inner pattern 502, used for a second tier search, if necessary. In block 420, a video stream 115 is received. As described in connection with FIG. 1, the video stream 115 may be received from a webcam 122 coupled to the video system 102. Through the network 128, the video system 102 may also receive a video stream 115 from another video system 103. In block 430, a tiered search is performed, whereby a first tier search of the target pattern 500 as a whole is performed.

Figure 10A:
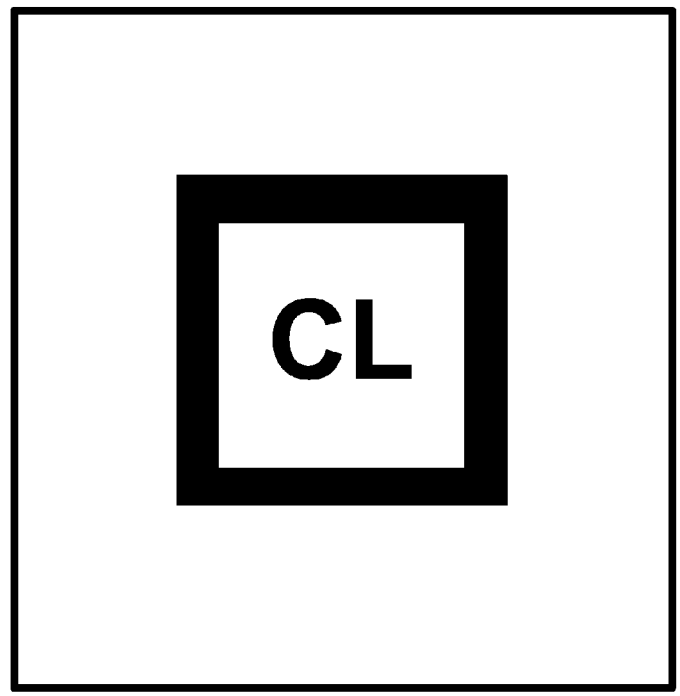
FIGS. 10A-B and 11-14 provide additional examples of target patterns that made to utilized in accordance with various embodiments.
Figure 10B:
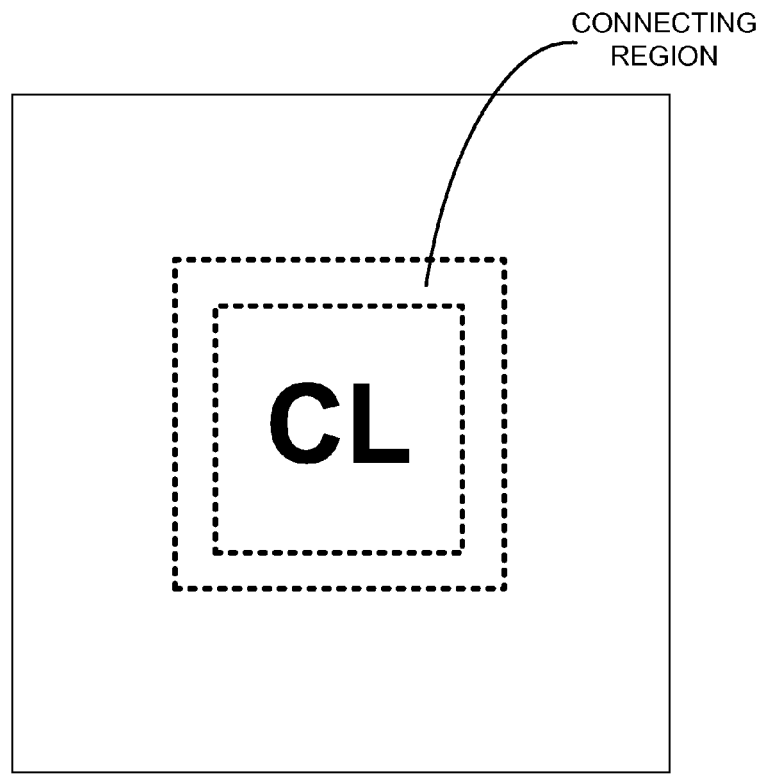

For some embodiments, the inner pattern includes a connecting region that is a different color than the remainder of the target pattern in order to facilitate identification of the inner pattern. Specifically, colors are selected such that the connecting region is in high contrast to the remainder of the target pattern. Shown in FIG. 10A is an exemplary target pattern where the connecting region is a different color than the remainder of the target pattern, thereby making it easier to identify the inner pattern. Shown in FIG. 10B is an example of a target pattern where the connecting region of the inner pattern is the same color as the remainder of the target pattern. Note that while this target pattern may still be utilized, the inner pattern is more difficult to track as implemented in FIG. 10B.

Figure 11:
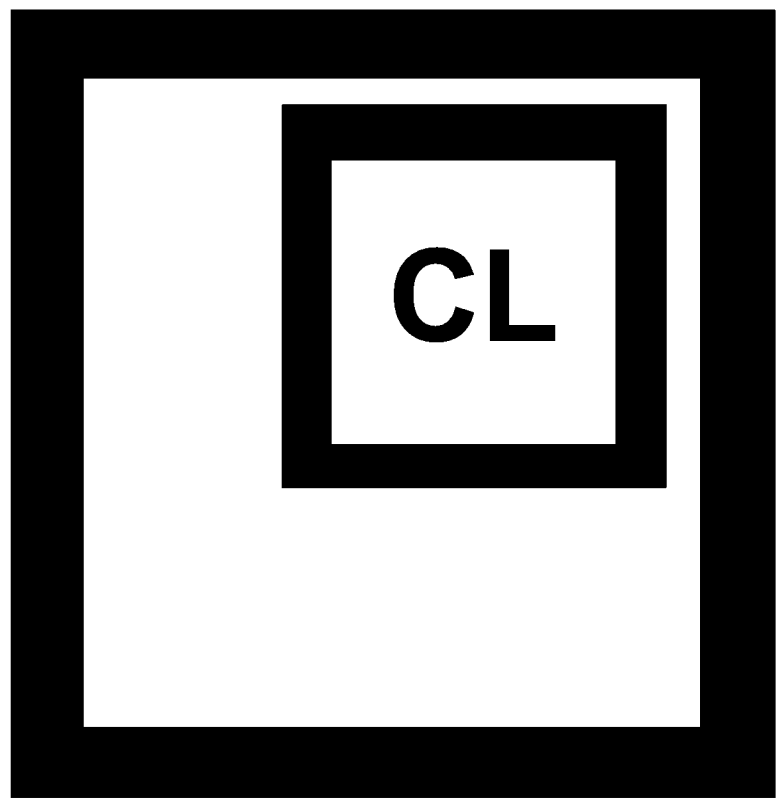
Figure 12:
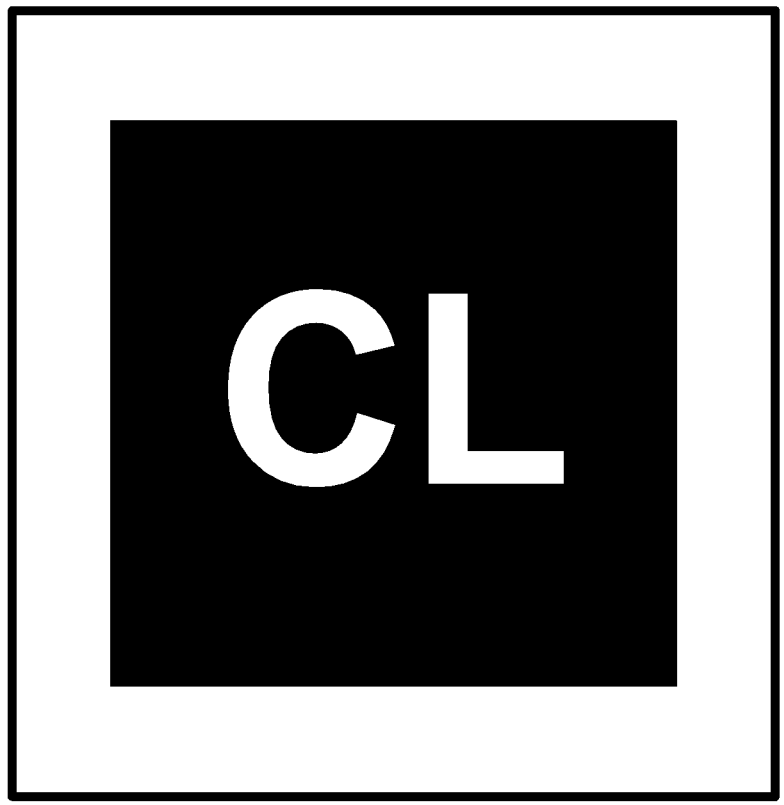
Figure 13:
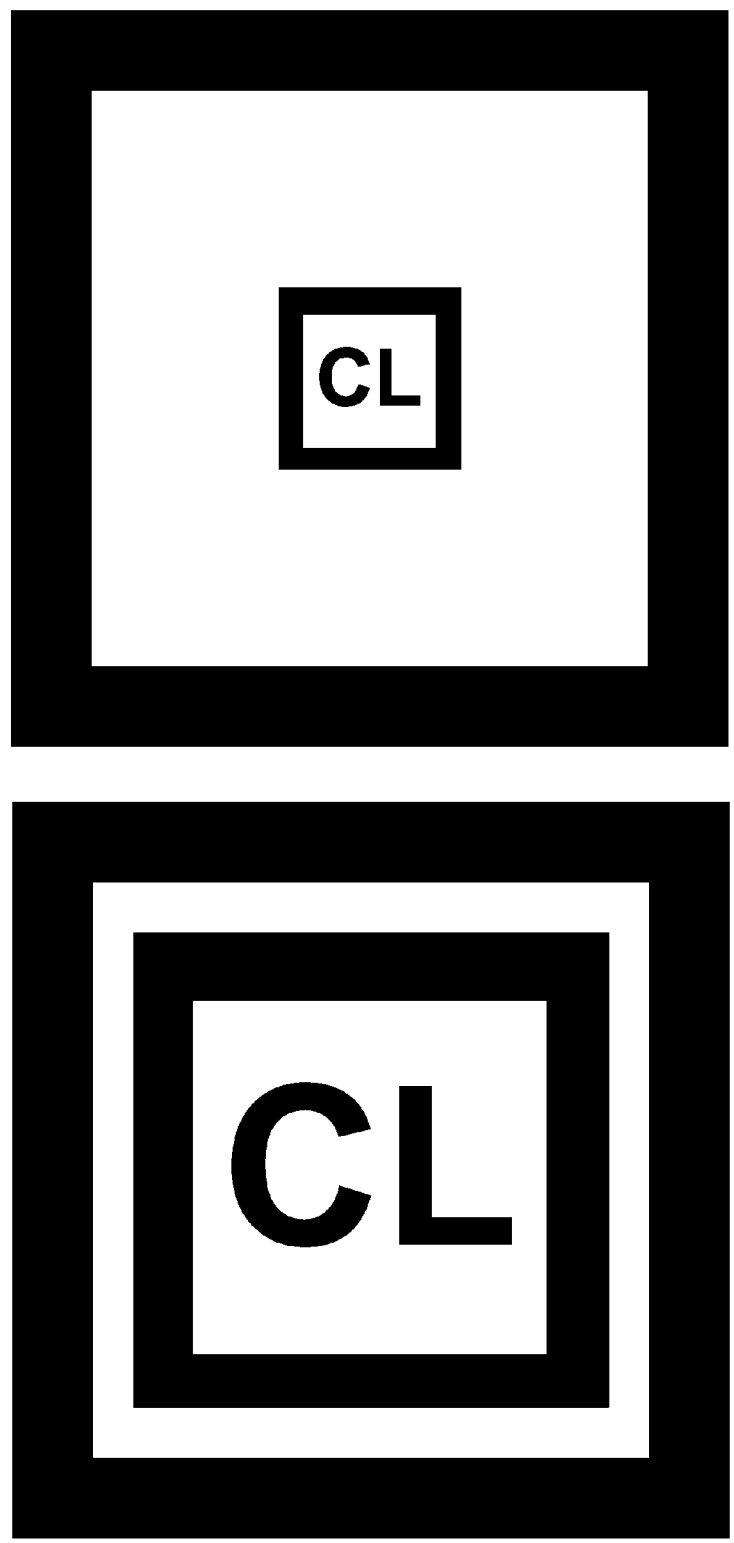
Figure 14:
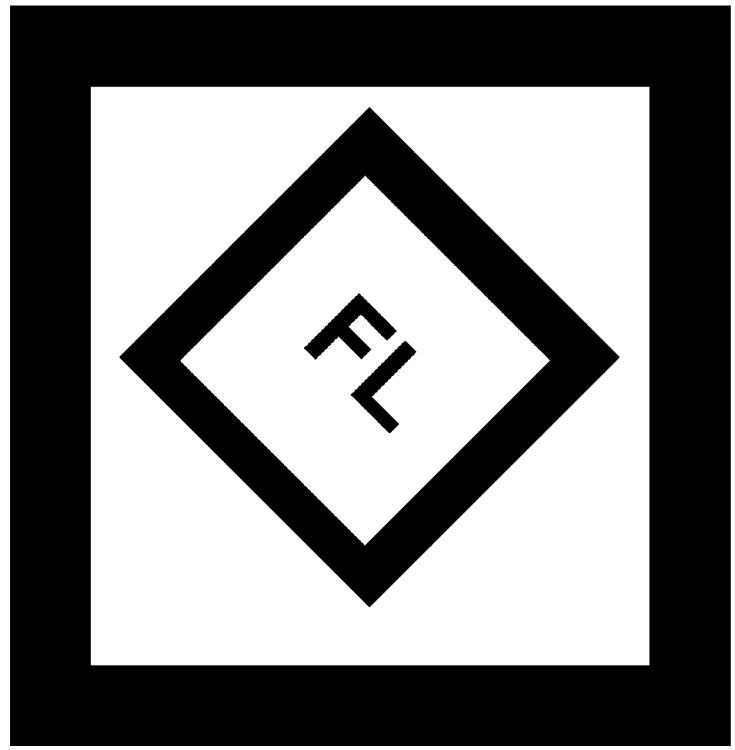
Figure 14:

It should also be emphasized that while the various examples of the target pattern illustrated in the previous figures depict the inner pattern being centrally located with respect to the target pattern, the inner pattern may also be offset from the center of the target pattern, as illustrated in FIG. 11. Shown in FIG. 12 is another example of a target pattern where the target pattern is inverse binarized. Based on the received video stream, it may be easier to track an inverse binarized version of the target pattern, particularly if the background of the video stream matches the outer portion of the target pattern and is in contrast with the inner pattern. FIG. 13 depicts other examples where the inner pattern relative to the remainder of the target pattern may vary and is not limited to a particular size. For example, the inner pattern may be relatively small or relatively large with respect to the target pattern as a whole. FIG. 14 depicts other examples where the inner pattern is offset from the center of the target pattern and where the inner pattern is rotated relative to the target pattern. Furthermore, as illustrated, different letters (i.e., those other than "CL" as depicted in other examples) may be used.

For some embodiments, the first tier search is based on a pattern matching algorithm, which may include, but is not limited to, template matching of the target pattern, hidden Markov model (HMM), support vector machine (SVM), and scale-invariant feature transform (SIFT). Prior to performing the pattern matching algorithm, the received video stream 115 is first binarized. For some embodiments, this is performed by processing each pixel within each frame of the video stream 115 and assigning a one or zero to each pixel. The assignment of a binary value to each pixel may be accomplished based on a number of techniques, including, but not limited to, edge detection and detection of a region of interest. Binary values may also be assigned to pixels according to a threshold based on luminance values, saturation values, intensity values, hue values, and degree of brightness.

For embodiments that utilize template matching for pattern matching, a comparison is made between two vectors—a vector within the frame and a template vector. For some embodiments, the frame being evaluated may be systematically divided into smaller vectors. Two parameters, L1 and L2, may be used, where L1 represents the absolute value of the distance between two vectors (V1-V2). The parameter L2 represents the square of the distance $(V1-V2)^2$, where a smaller value for L2 (or L1) indicates a higher degree of similarity (i.e., a higher likelihood that a match between the current pattern being evaluated and the template exists).

For other implementations, the cosine of the two vectors is determined, where a higher cosine value indicates a higher degree of similarity. If a predetermined degree of similarity is not met with a vector within the frame, then a failed attempt at locating the target pattern has occurred. The methods HMM and SVM relates to machine learning algorithms. Support vector machines are a set of related supervised learning methods that analyze data and recognize patterns used for classification and regression analysis. An SVM performs classification by constructing an N-dimensional hyperplane that optimally separates the data into two categories.

Multiclass SVM aims to assign labels to instances by using support vector machines, where the labels are drawn from a finite set of several elements. The dominating approach for doing so is to reduce the single multiclass problem into multiple binary classification problems. Each of the problems yields a binary classifier, which is assumed to produce an output function that gives relatively large values for examples from the positive class and relatively small values for examples belonging to the negative class.

For implementations utilizing SVM, the positive and negative data associated with the frame are collected for training purposes. After the training phase is complete, vectors within the frame are evaluated. If no vector in the frame passes the model, then a failed attempt at locating the target pattern has occurred. The SIFT technique relates to detecting local features in the frame. First, local features of the pre-defined template are extracted. Then, a comparison is made with local features in vectors of the frame being evaluated. If a predetermined number of matches is not achieved between the local features of the pre-defined template and the local features of any of the vectors in the frame, then a failed attempt at locating the target pattern has occurred.

Figure 8:
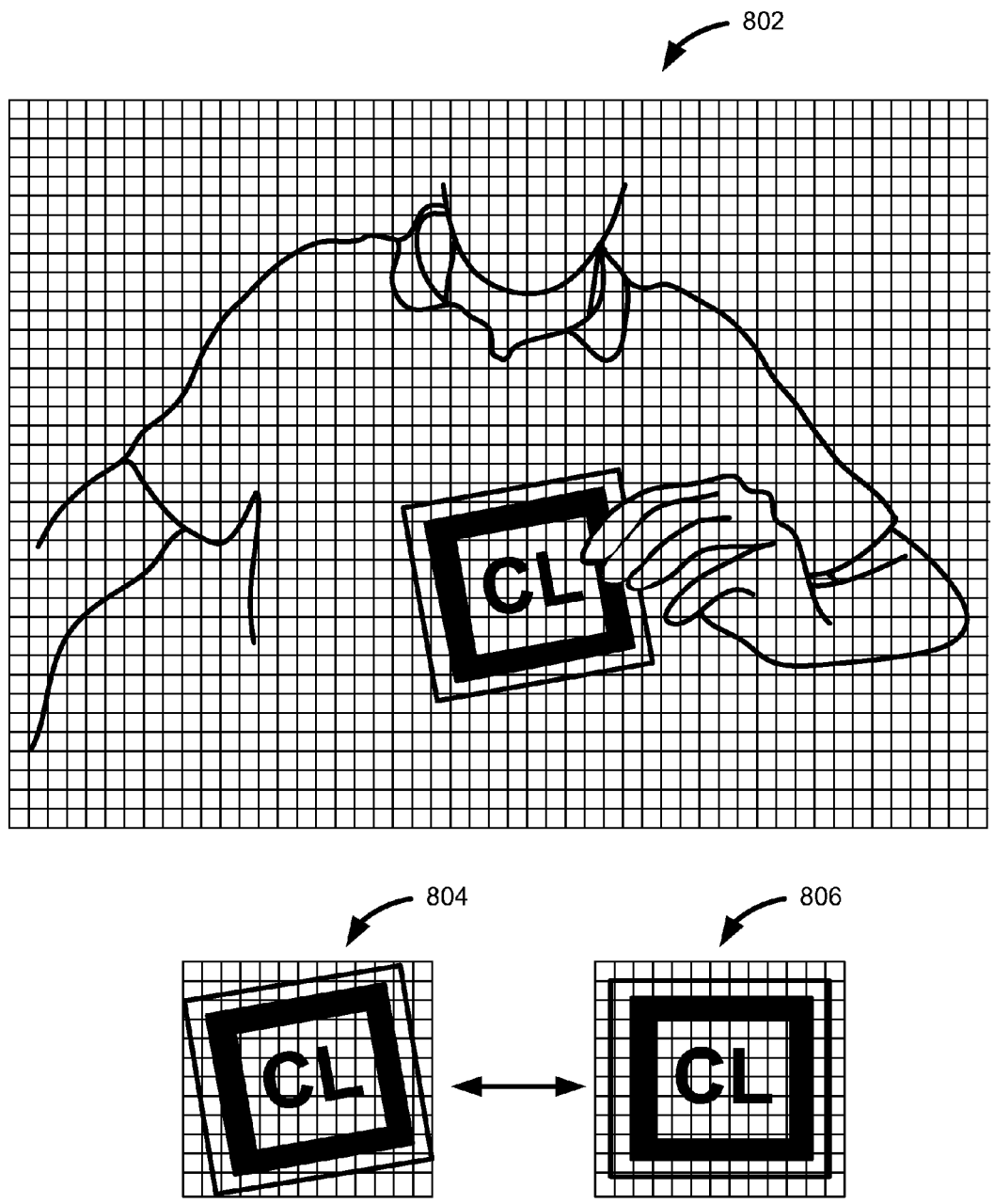
FIG. 8 illustrates the processing of a video stream on a pixel-by-pixel level.

Referring to FIG. 8, for some implementations, the target pattern is later tracked based on a single black region 802. The black region 802 is derived by converting each frame into a binary or black-and-white image based on a threshold. This black region is then partitioned into a predetermined number of blocks or sub-samples 804, and a comparison is made between each sub-sample within the black region with a template 806 of the target pattern. Based on this, a determination is made on whether the black region contains the target pattern of interest. Each block 804 comprises a pixel array (e.g., 16×16 pixels).

Referring back to FIG. 4, in decision block 440, a determination is made on whether the target pattern (such as the target pattern 500 in FIG. 5) as a whole has been successfully located. If the target pattern was successfully located, then in block 470, the orientation of the target pattern is determined and a virtual object is displayed on or near the target pattern in a manner consistent with the location and orientation of the target pattern.

Referring back to decision block 440, if, however, the target pattern was not successfully located, then in block 450, a second tier search is performed involving the inner pattern, such as the inner pattern 502 depicted in FIG. 5. As with the first tier search, the second tier search may be based on a pattern matching algorithm, which may include, but is not limited to, template matching of the target pattern, hidden Markov model (HMM), SVM, and scale-invariant feature transform.

Figure 6:
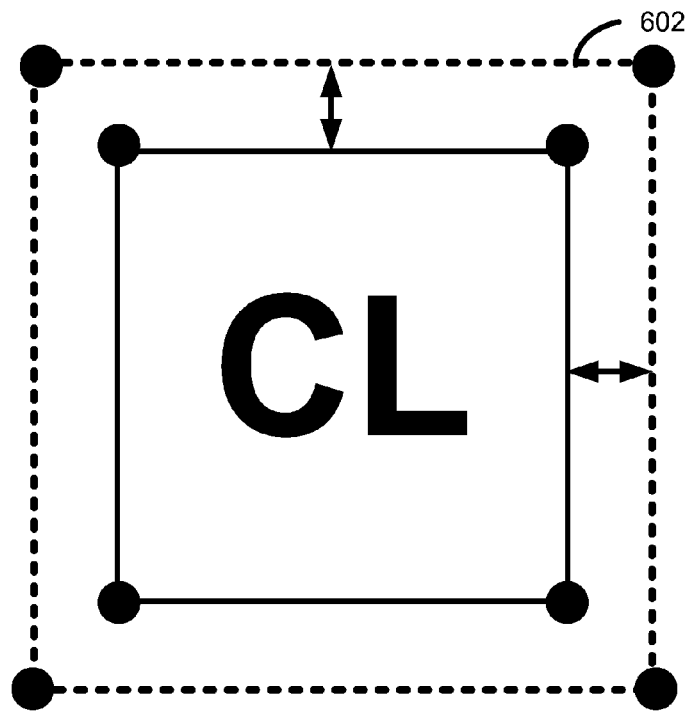

In block 460, based on the location of the inner pattern, the location of the target patters as a whole is extrapolated based on characteristics known a priori regarding the target pattern. As illustrated in FIG. 6, such characteristics may include the size of the target pattern with respect to a field of view associated with the video stream, a size of the inner pattern with respect to the target pattern, and placement of the inner pattern with respect to the target pattern. For some embodiments, the characteristics of the target pattern may be obtained by performing camera calibration during an initialization phase. For such embodiments, such information as the camera's position and view angle are determined to provide detailed characteristics relating to the predefined pattern.

Figure 7:
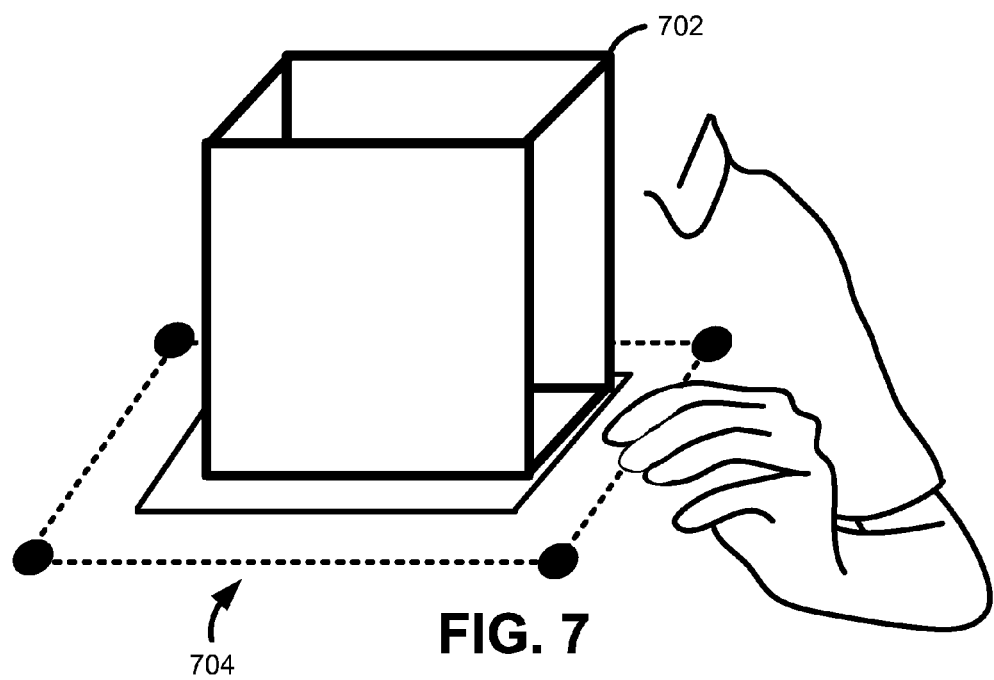
FIG. 7 illustrates placement of a virtual object based on the location and orientation of the target pattern.

For example, the distance and distance ratio (with respect to other points in the frame) relating to each point may be extracted during camera calibration. Based on the known position of the predefined pattern within the frame, the points of the predefined pattern can be used to compute the camera's parameters such as camera position and view angle based on information derived during camera calibration. Based on such characteristics, the outer boundary of the target pattern 602 can be estimated based on the known location of the inner pattern, camera's parameters and the relationship between the target pattern and the inner pattern. As illustrated in FIG. 7, in block 470, the orientation of the target pattern is determined and a virtual object 702 is displayed on or near the target pattern 704 in a manner consistent with the location and orientation of the target pattern 704 even if a portion of the target pattern 704 is occluded.

Figure 9A:
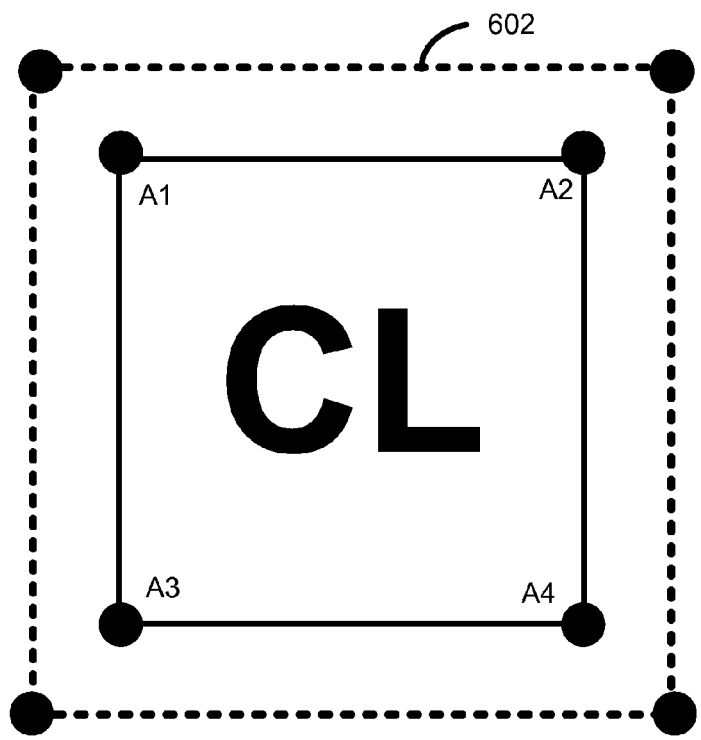
FIGS. 9A and 9B further illustrates the use of an inner pattern of a target pattern for tracking purposes based on calibration performed prior to receiving a video stream.
Figure 9B:
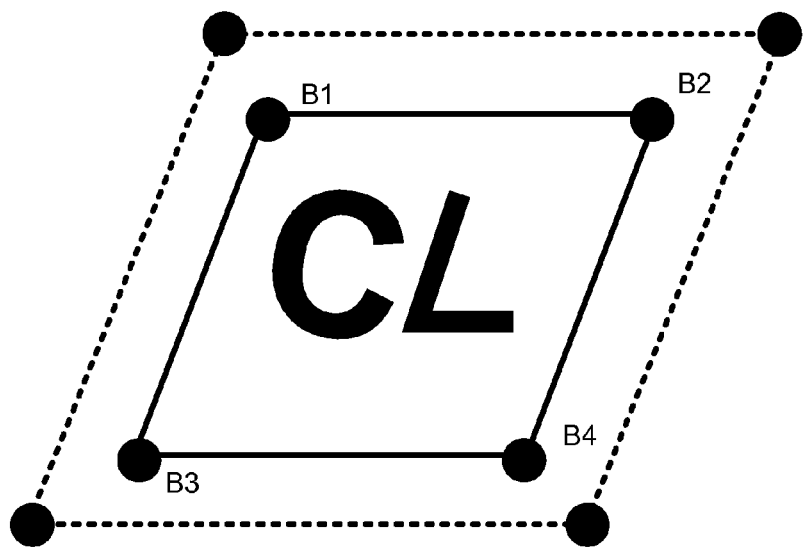

To further illustrate the concept of utilizing the relationship between the inner pattern and the target pattern, reference is made to FIGS. 9A and 9B. As shown in FIG. 9A, for some embodiments, the four corners of the inner pattern are determined (denoted in the figure as A1-A4). The spacing and relative location of each of the corners of the inner pattern with respect to the corners of the outer boundary of the target pattern are determined. For some embodiments, the determination of the spacing and relative location of the corners of the inner pattern with respect to the corners of the outer boundary of the target pattern may be determined during a camera calibration phase, for example, receiving a video stream.

In FIG. 9B, when the target pattern is moved and/or reoriented, the spacing and relative location of each of the corners (denoted as B1-B4) of the inner pattern are determined. Based on the known spacing of the corners of the inner pattern relative to the outer boundary of the target pattern, the location and orientation of the target pattern may be determined.

Figure 15:
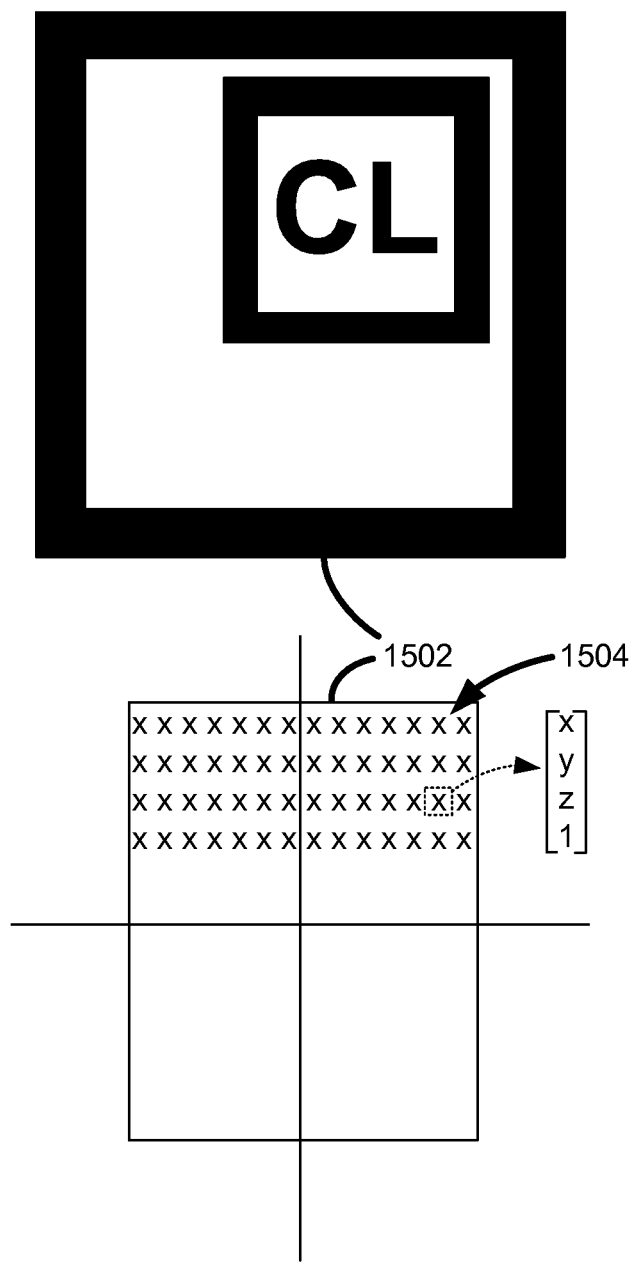
FIG. 15 illustrates the use of a transformation formula for determining the relationship between the inner pattern relative to the target pattern.

In accordance with some embodiments, a transformation formula may be utilized for transforming a mask associated with the target pattern to a mask associated with the inner pattern. Reference is made to FIG. 15, which depicts a sample target pattern 1502 utilized in accordance with the various techniques disclosed. Each target pattern 1502 comprises a series of individual points (e.g., pixels), where each point is identified by a corresponding coordinate 1504. In accordance with various embodiments, a transformation formula is derived whereby multiplying the transformation formula by the original model based on the set of coordinates associated with the target pattern results in transformation of the original model to the coordinates associated with the inner pattern, as shown below:

$$\begin{bmatrix} a_1 & a_2 & a_3 & a_4 \\ a_5 & a_6 & a_7 & a_8 \\ a_9 & a_{10} & a_{11} & a_{12} \\ 0 & 0 & 0 & 1 \end{bmatrix} * \begin{bmatrix} x \\ y \\ z \\ 1 \end{bmatrix} = \begin{bmatrix} x' \\ y' \\ z' \\ 1 \end{bmatrix}$$

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A method implemented in a video playback system for incorporating augmented reality into a video stream, comprising:
   determining a target pattern;
   determining an inner pattern in the target pattern, the inner pattern having a connecting region for separating the inner pattern from a remainder of the target pattern, the connecting region having a visual attribute differing from a visual attribute of at least a portion of the remainder of the target pattern bordering the inner pattern;
   determining a spatial relationship between the target pattern and the inner pattern utilizing the connecting region of the inner pattern;
   receiving, by the video playback system, frames of the video stream;
   for each frame within a frame sequence, performing binarization according to a predetermined threshold;
   determining a location of the target pattern in the binarized frame sequence;
   responsive to the location of the target pattern not being determinable, performing the steps of:
      determining a location of the inner pattern; and
      based on the location of the inner pattern on received frames in the frame sequence, determining an estimated location of the target pattern using the determined spatial relationship; and
   displaying a virtual object with the target pattern on an output device based on the estimated location of the target pattern.

2. The method of claim 1, wherein determining the relationship between the target pattern and the inner pattern is performed according to a spacing and relative location of each of the corners of the inner pattern with respect to corners of the outer boundary of the target pattern.

3. The method of claim 1, wherein determining the relationship between the target pattern and the inner pattern is performed according to a transformation formula for transforming a mask of the target pattern to a mask of the inner pattern.

4. The method of claim 1, wherein the step of determining the estimated location of the target pattern comprises:
   utilizing the location of the inner pattern on the received frames to compute parameters of a camera in the video playback system based on information derived during camera calibration; and
   determining the estimated location of the target pattern based on each of: the location of the inner pattern on received frames; the determined relationship between the target pattern and the inner pattern; and the computed parameters of the camera.

5. The method of claim 1, wherein the visual attribute comprises one of: a color of the connecting region and an intensity of the connecting region, wherein the inner pattern further comprises a boundary around the connecting region, and wherein at least one of a color and intensity of a remainder of the target pattern is different than one of the following: at least one of a color and an intensity of the connecting region; or at least one of a color and intensity of the boundary of the inner pattern.

6. The method of claim 1, wherein determining the inner pattern is performed by inversing the color or intensity of the target pattern.

7. The method of claim 1, wherein the inner pattern is offset relative to a center of the target pattern or orientation relative to the target pattern or scale relative to the target pattern.

8. A video system for incorporating augmented reality (AR) into a video stream, comprising:
   a computing device including a processor;
   an application executable in the computing device, the application comprising:
      a marker module configured to determine a target pattern within the video stream, the marker module further configured to determine an inner pattern of the target pattern, the inner pattern having a connecting region for separating the inner pattern from a remainder of the target pattern, the connecting region having a visual attribute differing from a visual attribute of at least a portion of the remainder of the target pattern bordering the inner pattern, wherein the marker module is further configured to determine a spatial relationship between the target pattern and the inner pattern utilizing the connecting region of the inner pattern;
      a tracker module configured to determine a location of the target pattern within the video stream;
      a location estimator configured to perform the following steps responsive to a location of the target pattern not being determinable: determine a location of the inner pattern; and determine an estimated location of the target pattern utilizing the determined spatial relationship between the target pattern and the inner pattern; and
      an effects module configured to integrate a virtual object into the video stream according to the estimated location of the target pattern.

9. The system of claim 8, wherein a tiered search performed by the tracker module comprises:
   a first search of the target pattern; and
   a second search of the inner pattern of the target pattern, the second search being performed only if the first search of the target pattern is unsuccessful.

10. The system of claim 9, wherein the first search and the second search are performed on a binarized form of the video stream.

11. The system of claim 9, wherein the first search and the second search are based on a pattern matching algorithm.

12. The system of claim 11, wherein the pattern matching algorithm comprises utilizing template matching for performing pattern matching, wherein template matching is based on a first vector V1, a second vector V2, a value L1, and a value L2, wherein L1 represents an absolute distance between the two vectors (V1-V2), and wherein L2 represents a square of the distance between the two vectors (V1-V2).sup.2.

13. The system of claim 8, wherein the marker module is configured to determine the relationship between the target pattern and the inner pattern during a calibration phase performed by the video system.

14. The system of claim 8, wherein the location estimator is configured to determine a location of the target pattern based on one of:
- a location of the target pattern if a search by the tracker module is successful; and
- an estimated location of the target pattern if the first search by the tracker module is unsuccessful, the estimated location being based on the location of the inner pattern and the determined relationship.

15. The system of claim 14, wherein the estimated location of the target pattern is based on predetermined characteristics of the target pattern, the predetermined characteristics comprising one or more of: a size of the target pattern with respect to a field of view associated with the video stream, a size of the inner pattern with respect to the target pattern, and placement of the inner pattern with respect to the target pattern.

16. The system of claim 14, wherein the estimated location of the target pattern comprises a position of the target pattern calculated by the tracker module based on: predetermined characteristics of the target pattern, and the determined location of the second search.

17. A method implemented in a video playback system for incorporating augmented reality (AR) into a video stream, comprising:
- determining a target pattern;
- determining an inner pattern in the target pattern, the inner pattern having a connecting region for separating the inner pattern from a remainder of the target pattern, the connecting region having a visual attribute differing from a visual attribute of at least a portion of the remainder of the target pattern bordering the inner pattern;
- determining a spatial relationship between the target pattern and the inner pattern utilizing the connecting region of the inner pattern;
- receiving, by the video playback system, a frame sequence of the video stream;
- determining whether a location of the target pattern can be determined, and responsive to a location of the target pattern not being determinable, performing the steps of:
 determining a location of the inner pattern;
 based on the location of the inner pattern and the determined spatial relationship between the target pattern and the inner pattern, determining an estimated location of the target pattern; and
- displaying a virtual object based on the estimated location of the target pattern.

18. The method of claim 17, further comprising: for each frame within the frame sequence, performing binarization according to a predetermined threshold.

19. The method of claim 18, wherein performing binarization comprises assigning a binary value to each pixel within each frame according to one of: edge detection, contrast, and detection of a region of interest (ROI).

20. The method of claim 18, wherein performing binarization comprises assigning a binary value to each pixel within each frame according to a threshold defined according to one of: luminance value, saturation value, intensity value, hue value, and brightness value.

21. The method of claim 17, wherein determining whether the location of the target pattern is determinable comprises matching a region within the frame to a template of the target pattern.

22. The method of claim 21, wherein matching a region within the frame to a template of the target pattern comprises matching a binarized region within the frame to a binary template of the target pattern.

23. The method of claim 21, wherein matching a region within the frame to a template of the target pattern is based on a first vector V1, a second vector V2, a value L1, and a value L2, wherein L1 represents an absolute distance between the two vectors (V1-V2), and wherein L2 represents a square of the distance between the two vectors (V1-V2).sup.2.

24. The method of claim 17, wherein determining the relationship between the target pattern and the inner pattern is performed according to a spacing and relative location of each of the corners of the inner pattern with respect to corners of the outer boundary of the target pattern.

25. The method of claim 17, wherein the visual attribute comprises one of: a color of the connecting region and an intensity of the connecting region, wherein the inner pattern further comprises a boundary around the connecting region, and wherein at least one of a color and intensity of a remainder of the target pattern is different than one of the following: at least one of a color and an intensity of the connecting region; or at least one of a color and intensity of the boundary of the inner pattern.

26. The method of claim 17, wherein the inner pattern is offset relative to a center of the target pattern or orientation relative to the target pattern or scale relative to the target pattern.

* * * * *